US012704206B2

(12) United States Patent
Sorkin

(10) Patent No.: US 12,704,206 B2
(45) Date of Patent: Aug. 11, 2026

(54) NESTABLE DUCTS WITH RINGS

(71) Applicant: Felix Sorkin, Stafford, TX (US)

(72) Inventor: Felix Sorkin, Stafford, TX (US)

(73) Assignee: Felix Sorkin, Stafford, TX (US)

( * ) Notice: Subject to any disclaimer, the term of this patent is extended or adjusted under 35 U.S.C. 154(b) by 416 days.

(21) Appl. No.: 18/234,073

(22) Filed: Aug. 15, 2023

(65) Prior Publication Data

US 2025/0060053 A1 Feb. 20, 2025

(51) Int. Cl.
*F16L 9/00* (2006.01)
*F24F 13/02* (2006.01)

(52) U.S. Cl.
CPC .......... *F16L 9/006* (2013.01); *F24F 13/0254* (2013.01)

(58) Field of Classification Search
CPC ....... F16L 9/006; F16L 9/128; F24F 13/0245; F24F 13/0272; F24F 13/0209; F24F 13/0254
See application file for complete search history.

(56) References Cited

U.S. PATENT DOCUMENTS 3,609,929 A 10/1971 Brown et al.
5,103,549 A * 4/1992 Meinig .................. F16L 23/08 29/890.144
5,593,744 A 1/1997 Van Vechten et al.
5,878,786 A * 3/1999 Elder ........................ F16L 9/17 138/109
6,109,665 A * 8/2000 Meinig ............... F24F 13/0209 285/365
6,758,502 B2 * 7/2004 Mattsson ............ F24F 13/0209 285/364
9,644,841 B2 * 5/2017 Zogg ........................ F23J 13/02
10,167,982 B2 * 1/2019 Johnson .................... F16L 3/26
10,731,781 B2 * 8/2020 Zogg ....................... F16L 23/12
2005/0108960 A1 5/2005 Schluter
2009/0058078 A1 * 3/2009 Knudson ............ F24F 13/0209 285/136.1
2019/0376636 A1 12/2019 Manville
2019/0390870 A1 * 12/2019 Fellinger ................ B32B 5/245
2020/0286407 A1 9/2020 Lanciaux

FOREIGN PATENT DOCUMENTS

KR 101841437 B1 * 5/2018 .......... F24F 13/0245

OTHER PUBLICATIONS

International Search report dated Nov. 15, 2024 issued in PCT application No. PCT/US2024/042469, 9 pages.

* cited by examiner

*Primary Examiner* — Nathan C Zollinger
(74) *Attorney, Agent, or Firm* — Ervin Cohen & Jessup LLP

(57) ABSTRACT

A nestable duct and a system for nestable ducts. The ducts have a discorectangular body and rings along the body. The ducts can be nested on top of one another.

20 Claims, 2 Drawing Sheets

NESTABLE DUCTS WITH RINGS

FIELD OF THE DISCLOSURE

The present disclosure relates to nestable ducts.

BACKGROUND

Conventionally, ducts used in construction are not designed or manufactured with nesting or stacking in mind. They are typically produced as standalone units without specific features to facilitate nesting or stacking configurations. This lack of consideration for nesting can lead to several challenges and problems within the construction industry, such as storage and transportation inefficiency, increased handling effort, limited flexibility in design and layout, and difficulties in retrofitting and modifications. Thus, there is currently a need for ducts that are nestable or stackable to address these problems.

SUMMARY OF THE DISCLOSURE

In some aspects, the techniques described herein relate to a nestable duct including: a body including an interior and an exterior, wherein the body has a discorectangular shape; and one or more discorectangular rings extending radially from the exterior, wherein the rings are beveled, wherein the rings are spaced evenly along the body such that the body includes one or more empty portions of the body that lack the rings; wherein the empty portions are equal in length to the width of the exterior, and wherein the portions that lack the rings are configured to nest perpendicularly with a second nestable duct body.

In some aspects, the techniques described herein relate to a nestable duct including: a body including an interior and an exterior, wherein the body has a discorectangular shape; and one or more discorectangular rings extending radially from the exterior, wherein the rings are spaced evenly along the body such that the body includes one or more empty portions of the body that lack the rings; wherein the portions that lack the rings are configured to nest perpendicularly with a plurality of similarly nestable duct bodies.

In some aspects, the techniques described herein relate to a nestable duct system including: a first duct having a discorectangular body with one or more rings extending radially from the body, wherein the rings are spaced evenly along the body of the first duct such that the body includes one or more empty portions of the body that lack the rings; a second duct having a discorectangular body with one or more rings extending radially therefrom, wherein the rings are spaced evenly along the body of the second duct such that the body includes one or more empty portions of the body that lack the rings; wherein the first duct is nested on top of the second duct, wherein an empty portion of the first duct sits on an empty portion of the second duct.

Further features of the disclosed systems and methods, and the advantages offered thereby, are explained in greater detail hereinafter with reference to specific example embodiments illustrated in the accompanying drawings.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

FIGS. 2A-2C illustrated nestable ducts according to an exemplary embodiment.

DETAILED DESCRIPTION

Figure 1:
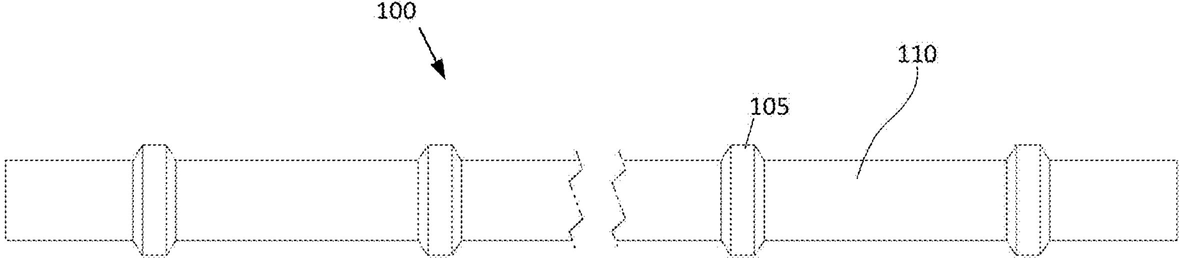
FIG. 1 illustrates a nestable duct according to an exemplary embodiment.

Exemplary embodiments of the invention will now be described in order to illustrate various features of the invention. The embodiments described herein are not intended to be limiting as to the scope of the invention, but rather are intended to provide examples of the components, use, and operation of the invention.

Furthermore, the described features, advantages, and characteristics of the embodiments may be combined in any suitable manner. One skilled in the relevant art will recognize that the embodiments may be practiced without one or more of the specific features or advantages of an embodiment. In other instances, additional features and advantages may be recognized in certain embodiments that may not be present in all embodiments.

The invention relates generally to nestable ducts that are made to stack or nest on top of one another. Ducts play a crucial role in the construction of reinforced concrete structures, providing pathways for various utilities and services within the building. They are essential for the efficient distribution of air, water, electrical wiring, communication cables, and other necessary systems.

In reinforced concrete construction, ducts are typically incorporated during the casting of structural elements such as beams, columns, slabs, and walls. They are designed and positioned to accommodate the specific requirements of the building's mechanical, electrical, and plumbing systems. Ducts are placed strategically within the concrete elements to allow for the installation, maintenance, and access to these systems. During the construction process, ducts are typically formed using various methods. This can involve prefabricated ductwork made of materials such as metal, plastic, or composite materials, which are placed or embedded within the concrete elements before pouring. Alternatively, ducts can be created by casting or forming voids within the concrete using removable forms or molds. These forms are later removed or left in place, depending on the design requirements.

Conventionally, ducts used in construction are not designed or manufactured with nesting or stacking in mind. They are typically produced as standalone units without specific features to facilitate nesting or stacking configurations. This lack of consideration for nesting can lead to several challenges and problems within the construction industry. Here are some of the issues that arise due to the conventional non-nestable design of ducts:

Non-nestable ducts consume more space during storage and transportation. The lack of nesting capability means that each duct must be individually accommodated, resulting in wasted space and increased logistical costs. This inefficiency becomes particularly problematic in situations where large quantities of ducts need to be stored or transported to construction sites with limited space. Additionally, non-nestable ducts require more manual labor and effort during handling and installation. Since they cannot be easily stacked, each duct must be individually positioned and aligned, prolonging the installation process and adding to the overall labor requirements. This increased handling effort can result in higher labor costs and potential delays in project timelines. Furthermore, non-nestable ducts impose constraints on the design and layout of the building's mechanical, electrical, and plumbing systems. The inability to stack or nest ducts restricts the possibilities for optimizing space utilization and may lead to inefficient routing or placement of ductwork. This limitation can impact the overall design efficiency and functionality of the building's services.

Nestable ducts offer a solution to the challenges posed by conventional non-nestable ducts in construction. These innovative ducts are specifically designed to address the limitations of traditional ducts by incorporating nesting capabilities. The nestable ducts consist of a body with a discorectangular shape, featuring an interior and an exterior. Radially extending from the exterior are one or more beveled discorectangular rings, which are evenly spaced along the body. Crucially, the body also includes one or more empty portions that lack the rings. These empty portions are precisely equal in length to the width of the exterior, allowing for seamless nesting. By configuring the portions without rings to nest perpendicularly with a second nestable duct body, the nestable ducts enable efficient stacking and nesting of multiple ducts. This design innovation significantly improves storage and transportation efficiency, simplifies handling and installation, enhances design flexibility, and enables easier retrofitting and modifications in construction projects.

FIG. 1 illustrates a top-down or bottom-up perspective on a discorectangular nestable duct 100. The nestable duct 100 can include a body 110 with a plurality of rings 105 extending radially from the body. The rings can be beveled, rounded, sloped, or otherwise configured to best mate or fit snugly with other similarly made ducts. The purpose of the rings 105 is to facilitate the nesting or stacking of multiple ducts together. The rings 105 can be spaced out according to any suitable length, i.e. they can be as far or as short apart as is necessary. The empty space between each ring 105 can be flat, suitable for stacking or nesting one duct on top of another. The rings 105 and the body 110 can be cast together as one continuous object, or the rings 105 can be made separately and become removably or nonremovably attached to the body 110 by some attachment means. The body 110 and the rings 105 can be made of suitable material including without limitation steel, aluminum, stainless steel, galvanized steel, PVC, HDPE, ABS, polypropylene, carbon fiber, or some combination thereof.

Figure 2C:
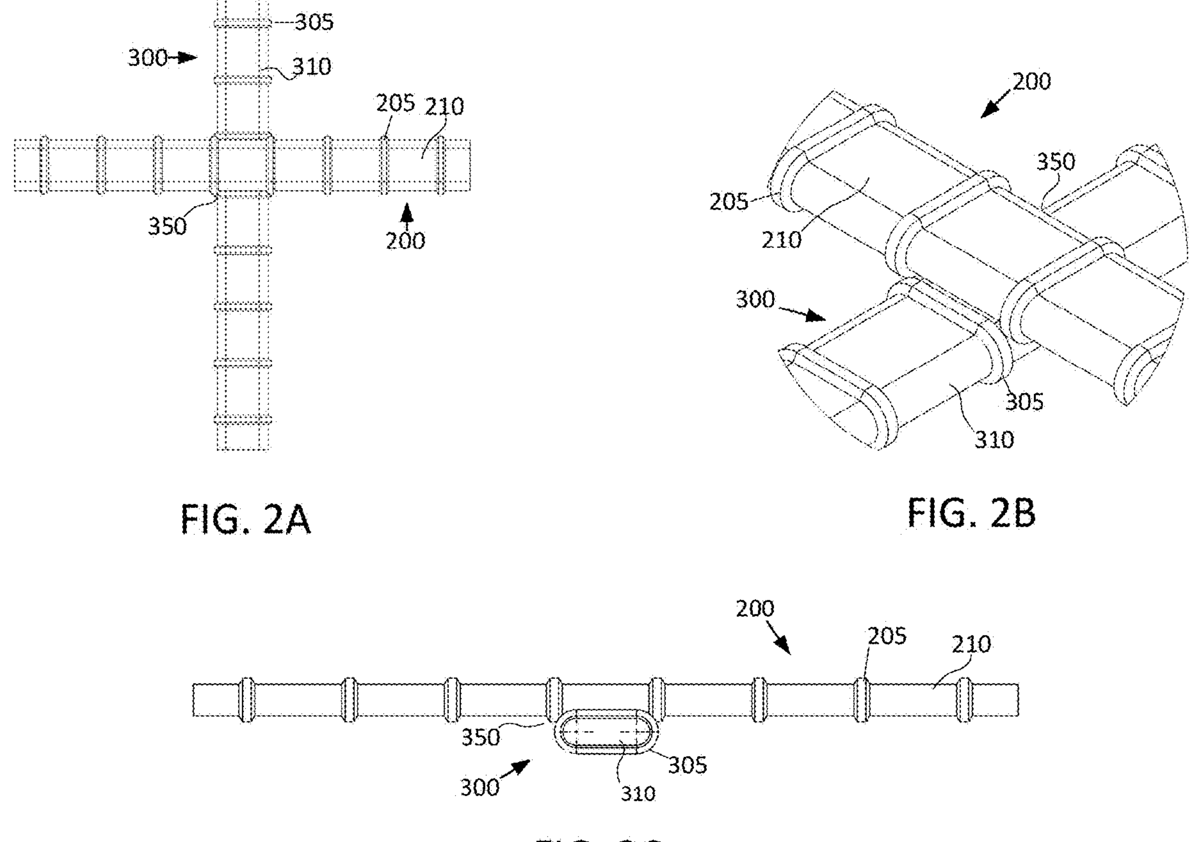

FIG. 2A illustrates a top down view of a first duct 200 nesting on top of a second duct 300, both of which are discorectangular. FIG. 2B illustrates an elevated perspective of the first duct 200 and the second duct 300. FIG. 2C illustrates a side view of the first duct 200 and the second duct 300. The first duct 200 can have a body 210 with rings 205 extending radially from the body 210, and the second duct 300 can have a body 310 with rings 305 extending radially from the body 310. The first duct 200 and the second duct 300 can be nested and stacked on top of one another in 350, in which the empty space between the rings of each duct can be mated. In some embodiments, the empty space between the rings of both ducts 200 and 300 can be the same measurement as the width of the bodies of the ducts 200 and 300, thus the ducts 200 and 300 can be aligned and nested more effectively. When two ducts are stacked or nested, the width of the lower duct aligns perfectly with the empty space between the rings of the upper duct. This alignment ensures a snug and secure fit between the ducts, optimizing the stability and integrity of the overall configuration. Furthermore, the consistent measurement of the empty space allows for efficient stacking of multiple ducts. When ducts are stacked on top of each other, the absence of rings in the empty space provides a flat surface for the lower duct to rest upon. This flat surface enables stable and secure stacking, minimizing the risk of movement or displacement between the ducts. In alternative embodiments, the measurement of the empty space between the rings in nestable ducts can be varied according to specific design requirements and intended applications. In certain applications, the measurement of the empty space may need to be adjustable or variable.

Furthermore, the discorectangular body shape of the nestable ducts, characterized by flat tops and bottoms, provides several advantages when it comes to stacking the ducts: The flat bottom surface of the discorectangular body ensures a stable and secure base for the ducts when stacked. The flatness allows for maximum contact and load distribution between the ducts, minimizing the risk of shifting or instability. The flat tops and bottoms of the discorectangular body aid in distributing the load evenly across the stack of ducts. The flat surfaces allow for uniform transfer of forces and prevent localized stress concentrations, promoting stability and structural integrity throughout the stack. Furthermore, the rounded edges of the discorectangular ducts help mitigate the risk of injuries or accidents during handling and installation. Unlike sharp or pointed edges, the rounded edges reduce the likelihood of cuts, bruises, or other injuries that can occur when working with ducts. This promotes a safer working environment for construction personnel. The rounded edges of the ducts also contribute to improved structural integrity. By eliminating sharp corners or edges, stress concentrations are reduced, enhancing the overall durability and strength of the ducts. The rounded edges distribute forces more evenly, minimizing the risk of localized damage or deformation under load. The rounded edges facilitate smooth airflow or fluid flow within the ducts. The absence of sharp edges or corners reduces turbulence, pressure drops, and flow disruptions, allowing for efficient and uninterrupted passage of air or fluids. This is particularly important in systems where consistent flow characteristics are desired, such as HVAC systems. The rounded edges of the discorectangular ducts make cleaning and maintenance tasks more manageable. Smooth, rounded surfaces are easier to clean, as they minimize the accumulation of debris or dust particles compared to sharp edges. This promotes better hygiene and allows for more effective maintenance practices, ensuring the optimal functioning of the duct system.

The ducts illustrated in FIGS. 1 and 2A-2C can have several applications. Nestable ducts can be used in heating, ventilation, and air conditioning (HVAC) systems to transport air from the central unit to different areas of a building. The ability to stack and nest the ducts allows for efficient utilization of space, especially in tight or constrained environments. Nestable ducts can also serve as conduits for electrical wiring in buildings. They provide a secure and organized pathway for electrical cables, ensuring proper distribution of power throughout the structure. The nestable design allows for easy installation and expansion of electrical systems, facilitating efficient wiring management. Additionally, nestable ducts can be utilized for plumbing and drainage systems, allowing the efficient flow of water, wastewater, and other fluids. The nesting feature enables space-saving installation, particularly in multi-story buildings where vertical alignment of plumbing lines is necessary. In commercial buildings or data centers, nestable ducts can be employed for cable management and organization. They provide a structured pathway for data cables, networking cables, and power cables, reducing the risk of tangling or damage while ensuring easy access for maintenance and upgrades. Nestable ducts find applications in industrial settings, such as factories or manufacturing plants, where the movement of gases, chemicals, or fluids is required. The ability to stack and nest the ducts allows for efficient utilization of limited space, streamlined installation, and improved overall system efficiency.

Furthermore, the ducts illustrated in these embodiments can be used in reinforced concrete structures involves integrating the ducts within the concrete elements to create a comprehensive and efficient building system. For example, the nestable ducts are placed within the formwork according to the design requirements. The ducts may be arranged vertically, horizontally, or in any other configuration as needed. They are securely positioned in the designated areas, ensuring proper alignment and spacing between the ducts. Once the ducts are in place, the reinforcement steel bars or mesh are positioned around the ducts. The reinforcement provides added strength and structural integrity to the concrete elements, working in conjunction with the nestable ducts to create a robust system. After the ducts and reinforcement are properly installed, concrete is poured into the formwork, encapsulating the nestable ducts within the concrete structure. The concrete is carefully placed and compacted to ensure complete encasement of the ducts, providing protection and stability. The poured concrete is allowed to cure and harden over time, gaining strength and durability. Once the concrete has achieved sufficient strength, finishing processes such as surface smoothing or application of protective coatings may be carried out, depending on the project requirements. One of the advantages of nestable ducts in reinforced concrete construction is their accessibility. The ducts can be accessed through openings or access points in the concrete structure, allowing for future maintenance, inspection, or modifications if needed. This accessibility facilitates easy installation or replacement of utilities or services running through the ducts. Incorporating nestable ducts within reinforced concrete structures offers the benefits of efficient space utilization, streamlined installation, and improved functionality of building systems.

In some aspects, the techniques described herein relate to a nestable duct including: a body including an interior and an exterior, wherein the body has a discorectangular shape; and one or more discorectangular rings extending radially from the exterior, wherein the rings are beveled, wherein the rings are spaced evenly along the body such that the body includes one or more empty portions of the body that lack the rings; wherein the empty portions are equal in length to the width of the exterior, and wherein the portions that lack the rings are configured to nest perpendicularly with a second nestable duct body.

In some aspects, the techniques described herein relate to a nestable duct, wherein the rings are evenly spaced along the body of the duct at intervals of 12 inches.

In some aspects, the techniques described herein relate to a nestable duct, wherein the rings extend radially from the body of the duct at an angle of 90 degrees.

In some aspects, the techniques described herein relate to a nestable duct, wherein the body is made of at least one selected from the group of fiberglass, carbon fiber, and polymer.

In some aspects, the techniques described herein relate to a nestable duct, wherein the rings are marked with one or more indicia configured to facilitate identification of one or more corresponding ducts during an installation.

In some aspects, the techniques described herein relate to a nestable duct, wherein the body includes a metal alloy material selected from the group consisting of aluminum, stainless steel, or galvanized steel.

In some aspects, the techniques described herein relate to a nestable duct, wherein the rings have a trapezoidal shape with beveled edges.

In some aspects, the techniques described herein relate to a nestable duct, wherein the rings have a tapered shape with a decreasing width along their radial extension.

In some aspects, the techniques described herein relate to a nestable duct, wherein the rings have a stepped shape with multiple levels or tiers.

In some aspects, the techniques described herein relate to a nestable duct including: a body including an interior and an exterior, wherein the body has a discorectangular shape; and one or more discorectangular rings extending radially from the exterior, wherein the rings are spaced evenly along the body such that the body includes one or more empty portions of the body that lack the rings; wherein the portions that lack the rings are configured to nest perpendicularly with a plurality of similarly nestable duct bodies.

In some aspects, the techniques described herein relate to a nestable duct, wherein the body and the rings are made of two different compositions.

In some aspects, the techniques described herein relate to a nestable duct, wherein the rings are removably attached to the body.

In some aspects, the techniques described herein relate to a nestable duct, wherein the rings are nonremovably attached to the body.

In some aspects, the techniques described herein relate to a nestable duct, wherein the rings are configured to removably mate with a set of rings on a second nestable duct body by an interlocking mechanism.

In some aspects, the techniques described herein relate to a nestable duct, wherein the body is made of at least one selected from the group of fiberglass, carbon fiber, and polymer.

In some aspects, the techniques described herein relate to a nestable duct, wherein the rings extend radially from the body of the duct at an angle of 90 degrees.

In some aspects, the techniques described herein relate to a nestable duct, wherein the body includes a metal alloy material selected from the group consisting of aluminum, stainless steel, or galvanized steel.

In some aspects, the techniques described herein relate to a nestable duct system including: a first duct having a discorectangular body with one or more rings extending radially from the body, wherein the rings are spaced evenly along the body of the first duct such that the body includes one or more empty portions of the body that lack the rings; a second duct having a discorectangular body with one or more rings extending radially therefrom, wherein the rings are spaced evenly along the body of the second duct such that the body includes one or more empty portions of the body that lack the rings; wherein the first duct is nested on top of the second duct, wherein an empty portion of the first duct sits on an empty portion of the second duct.

In some aspects, the techniques described herein relate to a nestable duct system, wherein each ring is beveled.

In some aspects, the techniques described herein relate to a nestable duct system, wherein the system further includes a plurality of additional ducts each having a discorectangular body with one or more rings extending radially from the body, wherein the rings are spaced evenly along the body of each duct such that the body includes one or more empty portions of the body that lack the rings.

Although embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes. The invention should therefore not be limited by the above described embodiments, method, and examples, but by all embodiments within the scope and spirit of the invention as claimed.

Further, it is to be understood that the terminology used herein is for the purpose of describing particular embodiments only and is not intended to be limiting. The terms "a" or "an" as used herein, are defined as one or more than one. The term "plurality" as used herein, is defined as two or more than two. The term "another" as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper," "lower," "left," "rear," "right," "front," "vertical," "horizontal," and derivatives thereof relate to the invention as oriented in the figures and is not to be construed as limiting any feature to be a particular orientation, as said orientation may be changed based on the user's perspective of the device.

In the invention, various embodiments have been described with references to the accompanying drawings. It may, however, be evident that various modifications and changes may be made thereto, and additional embodiments may be implemented, without departing from the broader scope of the invention as set forth in the claims that follow. The invention and drawings are accordingly to be regarded in an illustrative rather than restrictive sense.

The invention is not to be limited in terms of the particular embodiments described herein, which are intended as illustrations of various aspects. Many modifications and variations can be made without departing from its spirit and scope. Functionally equivalent systems, processes and apparatuses within the scope of the invention, in addition to those enumerated herein, may be apparent from the representative descriptions herein. Such modifications and variations are intended to fall within the scope of the appended claims. The invention is to be limited only by the terms of the appended claims, along with the full scope of equivalents to which such representative claims are entitled.

The preceding description of exemplary embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

What is claimed is:

1. A nestable duct comprising:

a body comprising an interior and an exterior, wherein the body has a discorectangular shape; and one or more discorectangular rings extending radially from the exterior, wherein the rings are beveled, wherein the rings are spaced evenly along the body such that the body comprises one or more empty portions of the body that lack the rings;

wherein the empty portions are equal in length to the width of the exterior, wherein the portions that lack the rings are configured to nest perpendicularly with a second nestable duct body.

2. The nestable duct of claim 1, wherein the rings are evenly spaced along the body of the duct at intervals of 12 inches.

3. The nestable duct of claim 1, wherein the rings extend radially from the body of the duct at an angle of 90 degrees.

4. The nestable duct of claim 1, wherein the body is made of at least one material selected from the group of fiberglass, carbon fiber, and polymer.

5. The nestable duct of claim 1, wherein the rings are marked with one or more indicia configured to facilitate identification of one or more corresponding ducts during an installation.

6. The nestable duct of claim 1, wherein the body comprises a metal alloy material selected from the group consisting of aluminum, stainless steel, or galvanized steel.

7. The nestable duct of claim 1, wherein the rings have a trapezoidal shape with beveled edges.

8. The nestable duct of claim 1, wherein the rings have a tapered shape with a decreasing width along their radial extension.

9. The nestable duct of claim 1, wherein the rings have a stepped shape with multiple levels or tiers.

10. A nestable duct comprising:

a body comprising an interior and an exterior, wherein the body has a discorectangular shape; and one or more discorectangular rings extending radially from the exterior, wherein the rings are spaced evenly along the body such that the body comprises one or more empty portions of the body that lack the rings;

wherein the portions that lack the rings are configured to nest perpendicularly with a plurality of similarly nestable duct bodies.

11. The nestable duct of claim 10, wherein the body and the rings are made of two different compositions.

12. The nestable duct of claim 10, wherein the rings are removably attached to the body.

13. The nestable duct of claim 10, wherein the rings are nonremovably attached to the body.

14. The nestable duct of claim 10, wherein the rings are configured to removably mate with a set of rings on a second nestable duct body by an interlocking mechanism.

15. The nestable duct of claim 10, wherein the body is made of at least one material selected from the group of fiberglass, carbon fiber, and polymer.

16. The nestable duct of claim 10, wherein the rings extend radially from the body of the duct at an angle of 90 degrees.

17. The nestable duct of claim 10, wherein the body comprises a metal alloy material selected from the group consisting of aluminum, stainless steel, or galvanized steel.

18. A nestable duct system comprising:

a first duct having a discorectangular body with one or more rings extending radially from the body, wherein the rings are spaced evenly along the body of the first duct such that the body comprises one or more empty portions of the body that lack the rings; and a second duct having a discorectangular body with one or more rings extending radially therefrom, wherein the rings are spaced evenly along the body of the second duct such that the body comprises one or more empty portions of the body that lack the rings;

wherein the first duct is nested on top of the second duct, wherein an empty portion of the first duct sits on an empty portion of the second duct.

19. The nestable duct system of claim 18, wherein each ring is beveled.

20. The nestable duct system of claim 18, wherein the system further comprises a plurality of additional ducts each having a discorectangular body with one or more rings extending radially from the body, wherein the rings are spaced evenly along the body of each duct such that the body comprises one or more empty portions of the body that lack the rings.

* * * * *